United States Patent [19]

Norton et al.

[11] Patent Number: 4,661,870
[45] Date of Patent: * Apr. 28, 1987

[54] AUTOMATIC MICRO-FLOPPY DISK DRIVE LOADER

[75] Inventors: James A. Norton, Orange; Brent W. Murray, El Toro, both of Calif.

[73] Assignee: Media Systems Technology, Inc., Irvine, Calif.

[*] Notice: The portion of the term of this patent subsequent to Oct. 28, 2003 has been disclaimed.

[21] Appl. No.: 821,511

[22] Filed: Jan. 22, 1986

Related U.S. Application Data

[63] Continuation of Ser. No. 554,988, Nov. 25, 1983, abandoned.

[51] Int. Cl.⁴ .............................................. G11B 5/012
[52] U.S. Cl. ..................................................... 360/98
[58] Field of Search ...................... 360/15, 86, 97–99, 360/91, 92, 133; 206/444; 353/112, 113; 414/32, 51; 369/178, 180, 191–195

[56] References Cited

U.S. PATENT DOCUMENTS

| | | | |
|---|---|---|---|
| 3,756,608 | 9/1973 | O'Neil et al. | 360/92 |
| 3,758,122 | 9/1973 | Kawaharasaki | 360/92 |
| 3,846,836 | 11/1974 | Masse et al. | 360/98 |
| 3,926,426 | 12/1975 | Toriumi | 271/3 |
| 3,931,640 | 1/1976 | Takahara | 360/86 |
| 3,976,300 | 8/1976 | Bruer | 274/1 R |
| 4,092,685 | 5/1978 | Sander et al. | 360/92 |
| 4,131,273 | 12/1978 | Kufrin | 271/4 |
| 4,170,031 | 10/1979 | Beuch et al. | 360/98 |
| 4,195,321 | 3/1980 | Chelin | 360/98 |
| 4,363,044 | 12/1982 | Castrodale et al. | 360/98 |
| 4,453,188 | 1/1984 | Johnson et al. | 360/78 |
| 4,494,156 | 1/1985 | Kadison | 360/48 |
| 4,494,900 | 1/1985 | Johnson et al. | 360/133 X |
| 4,510,542 | 4/1985 | Aggeler | 360/98 |

FOREIGN PATENT DOCUMENTS

| | | | |
|---|---|---|---|
| 57-111856 | 7/1982 | Japan | 360/98 |
| 876557 | 9/1961 | United Kingdom | 369/202 |
| 2099203 | 12/1982 | United Kingdom | 360/99 |

OTHER PUBLICATIONS

Larson et al., "Orient and Interlock Sensor Arrangement for Diskette Picker Mechanism," IBM Tech. Disc. Bull., vol. 20, No. 12, May 1978.

Johnson et al., "Document Transport System", IBM Technical Disclosure Bulletin, Nov. 1970, vol. 13, No. 6, pp. 1468–1469.

R. A. Johnson et al., "Magnetic Card Feeder", Xerox Disclosure Journal, Mar. 1981, vol. 6, No. 2, pp. 55–56.

*Primary Examiner*—Stuart N. Hecker
*Assistant Examiner*—Benjamin E. Urcia
*Attorney, Agent, or Firm*—Knobbe, Martens, Olson & Bear

[57] ABSTRACT

An automatic micro-floppy disk loader allows a stack of micro-floppy computer disks to be fed into a disk drive, one at a time, and fed out of the drive into selector bins. The loader has self-aligning construction so that the mechanisms used to transport and control the motion of the micro-floppy disks are placed in correct alignment during manufacturing without requiring manual, individualized adjustment. The disk drive is mounted in a movable frame construction such that the disk drive can be positioned to receive micro-floppy disks, and can be further positioned to eject the micro-floppy disks onto a mechanism for transporting the ejected disks to one of the two horizontally separated bins. The improved loader construction also allows the automatic feeding of micro-floppy disks while minimizing the chances of jamming or damaging the disks, and further includes automatic means for detecting and clearing jams which occur.

34 Claims, 16 Drawing Figures

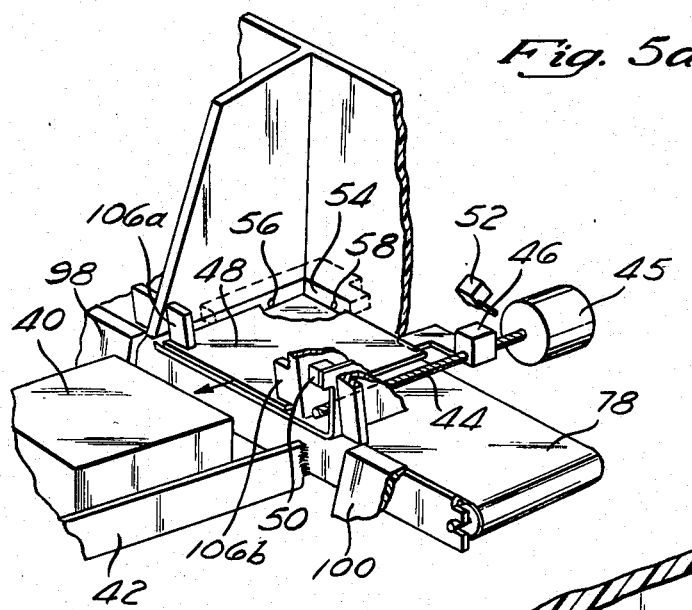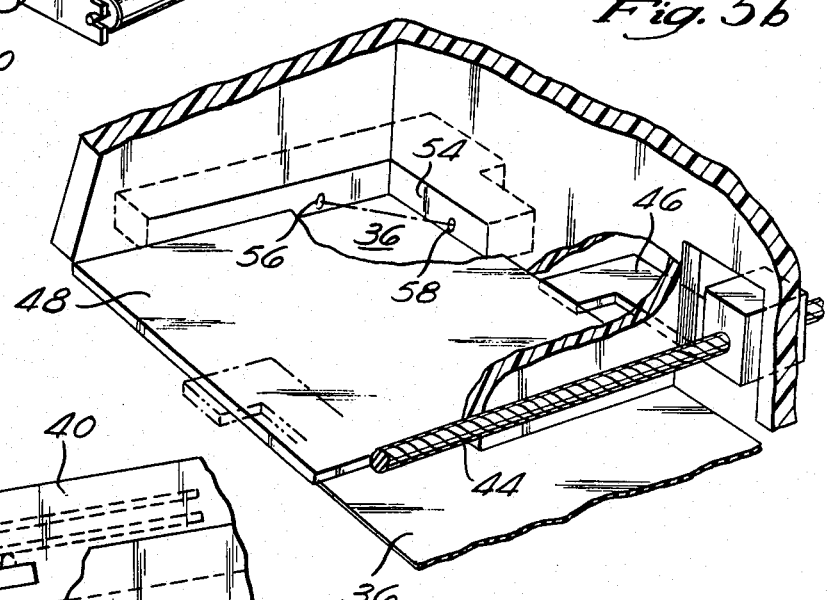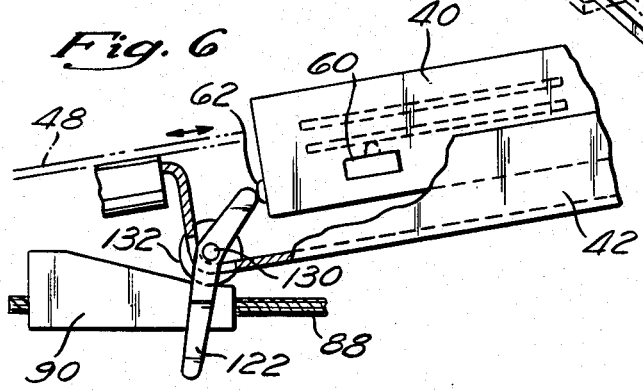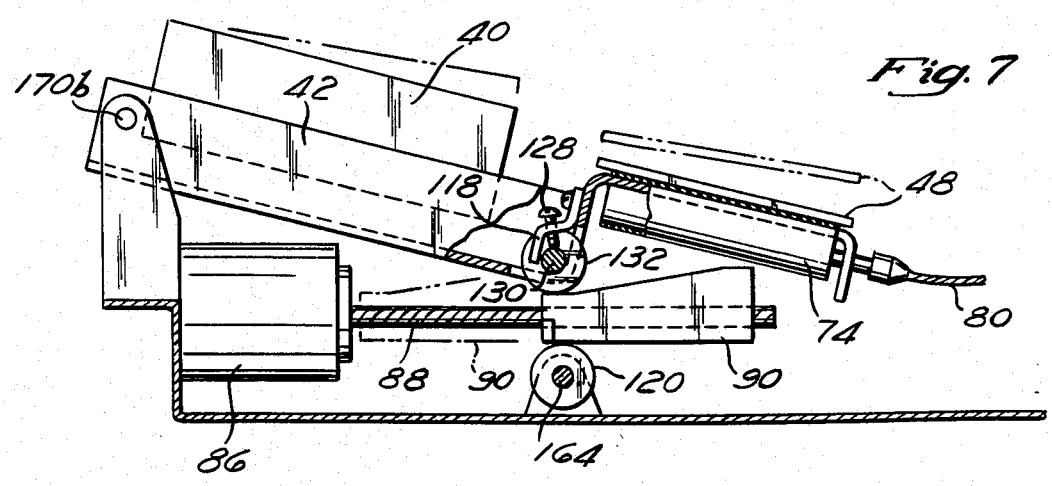

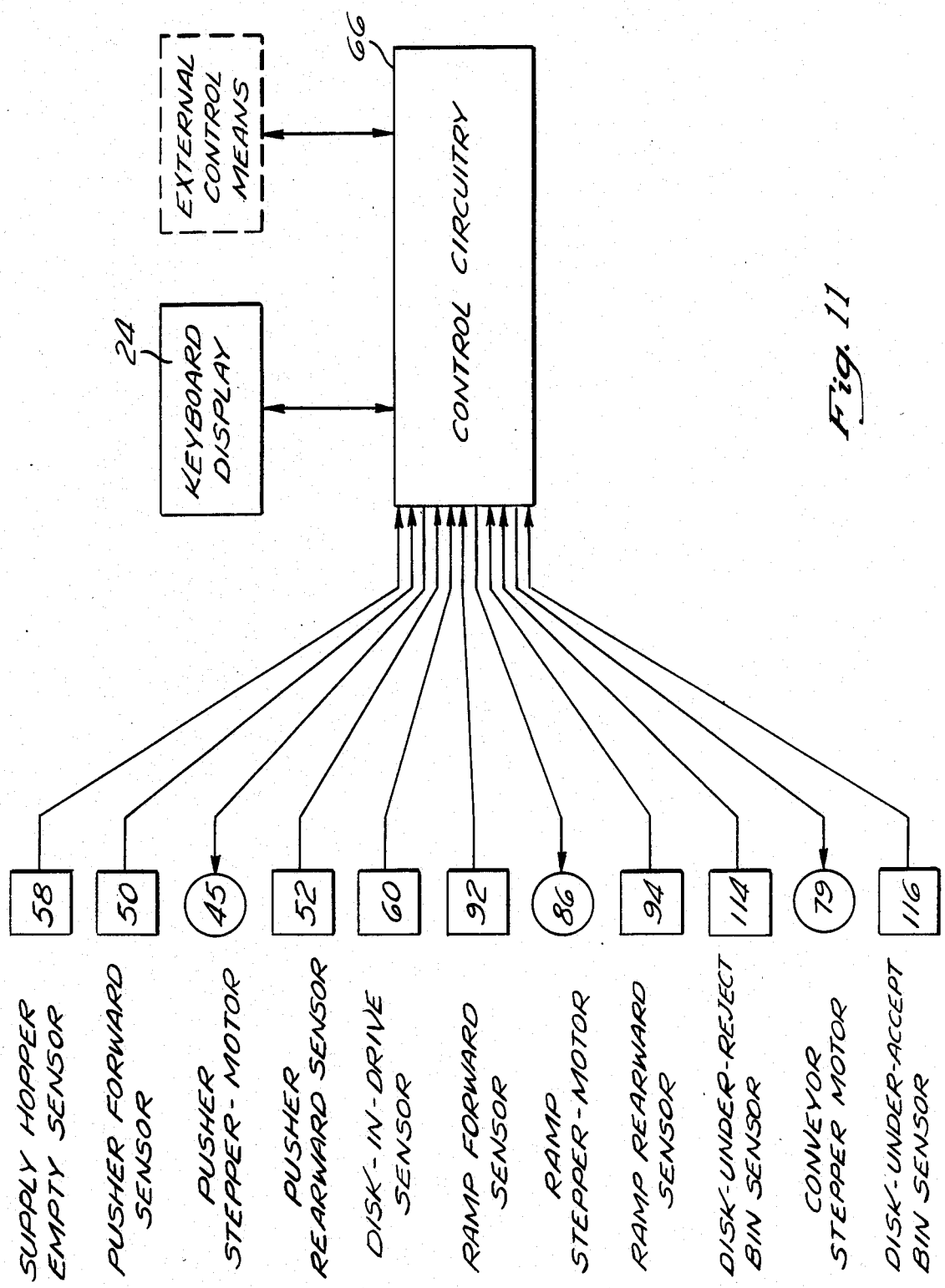

AUTOMATIC MICRO-FLOPPY DISK DRIVE LOADER

This is a continuation of application Ser. No. 554,988, filed Nov. 25, 1983, now abandoned.

FIELD OF THE INVENTION

This invention is generally related to data storage media handling systems and more particularly pertains to devices for automatically feeding micro-floppy disks into and out of computer disk drives.

BACKGROUND OF THE INVENTION

Micro-floppy disks (or diskettes) are used in the data processing industry for storing computer programs, data, etc. The micro-floppy disks are flat, circular sheets of plastic having magnetic particles which store digital data. The plastic disks are stored inside rectangular envelopes or jackets which prevent the disks from being damaged and provides convenient storage of the disks. The micro-floppy disk consists of the circular plastic disk which is permanently enclosed by the rectangular envelope. Unlike the so called "floppy disks" in widespread use which are of 8" or 5¼" size, and which are further enclosed in an essentially square envelope of flexible material, the micro-floppy disks range in size from 3" to 3½", and may be either rectangular or square in outline. In addition, the micro-floppy disks are packaged in a semi-rigid plastic material such that the package is not flexible. Also unlike the larger floppy disks, the semi-rigid package of the micro-floppy disk is enclosed such that the recording media is not exposed to the external environment except when the micro-floppy disks are in place in a micro-floppy disk drive.

A magnetic recording/detecting head inside the disk drive reads or writes digital data from or to the spinning plastic disk. The micro-floppy computer disk is a particularly convenient and compact device for storing relatively large amounts of digital data. Micro-floppy disks are typically used for personal computers and smaller computer systems including microcomputers and minicomputers. Typically, a micro-floppy disk is loaded through a slot in the front of a disk drive. When the disk is fully in place, the internal mechanism of the disk drive lowers the disk onto a spindle connected to a motor. The motor causes the disk to rotate beneath the recording/detecting head, and the head can be positioned to read data from or write data to the magnetic storage media of the disk. After completion of operation on the disk, the micro-floppy disk can be ejected from the disk drive and replaced by another disk.

Of course, the loading and ejection of micro-floppy disks can be performed manually. However, because the computer industry is a very volatile and fast-moving market, it is desirable for computer program suppliers to have a large number of computer program copies on micro-floppy disks available for immediate delivery when revisions, updates, or new programs are announced. In order to exert quality control in the use of or production of micro-floppy disks, it is desirable to have ways to rapidly copy and test large numbers of disks during manufacturing of the disks and during the process of transferring computer data or programs to the disks. Manually, loading the disks into and ejecting the disks from a disk drive for copying and/or verifying would be time-consuming and would introduce the probability of human error into the process. Thus, automatic loader assemblies have been manufactured to load disks into a disk drive and sort the disks after they are ejected from the disk drive.

The prior art loader assemblies sequentially feed 5¼" floppy disks in a flexible package into a copy disk drive and sort the floppy disks into two separate bins as they exit from the disk drive. These prior art loaders utilize the ability to transport the flexible diskette packages between rollers or similar devices. However, the semi-rigid packaging of the micro-floppy disks does not lend itself to being transported to and from the disk drive via roller mechanisms. Thus, the recent development of the micro-floppy disks requires a new and innovative method of loading the disks into the disk drive, receiving the ejected disks from the disk drive, and transporting the disks to the selected output bin.

SUMMARY OF THE INVENTION

The automatic micro-floppy disk loader apparatus of this invention includes a micro-floppy disk drive mounted to an alignment framework movably mounted to the loader enclosure. The micro-floppy disk drive is a commercially available drive with minimal modification required for implementation into the instant invention. The disk drive is mounted on the alignment framework such that in the full raised position of such alignment framework, the disk entrance of the micro-floppy disk drive is accurately aligned with the bottom surface of a supply hopper. The disks stacked in the supply hopper are automatically inserted into the disk drive mechanism. A conveyor belt assembly is also mounted to the alignment framework beneath the supply hopper and two horizontally separated floppy-disk bins. One such bin, which will be hereinafter referred to as the "accept bin", is positioned on one side of the supply hopper; and the other such bin, referred hereinafter as the "reject bin", is positioned on the opposite side of the supply hopper.

When the alignment framework is lowered to its lowest position, the disk drive is caused to eject any micro-floppy disk contained therein onto the center portion of the conveyor belt. Thereafter, in response to pulsed signals to a stepper-motor, the conveyor belt transports the ejected micro-floppy disk in the direction of the accept bin or in the direction the reject bin. When the micro-floppy disk reaches the end of the conveyor belt in the direction of the selected bin, the alignment framework is raised to its highest position, causing the disk drive to return to the position in which it is ready to accept a new disk from the supply hopper. In addition, the raising of the conveyor belt assembly causes the ejected micro-floppy disk to be pushed vertically upward to the bottom of the accept bin or the reject bin. The ejected micro-floppy disk is pushed through pawl mechanisms such that the micro-floppy disk will remain in place when the conveyor belt assembly is lowered thereafter. Except when the conveyor belt assembly is lowered to receive a disk ejected from the disk drive, the conveyor belt supports the disks in the accept and reject bins. Thus, the weight of the disks is not carried by the pawl mechanisms except for the relatively short duration of each unload operation. This has the advantageous effect of reducing the stress on the bottom disk in each stack.

The conveyor belt assembly is provided with sensors to detect the presence of a micro-floppy disk beneath the accept bin or beneath the reject bin positioned to be pushed upward into the bin. The supply hopper has a sensor which detects the absence of any micro-floppy disks when the hopper is empty. The alignment framework has sensors to detect the presence of a micro-floppy disk in the disk drive mechanism. It also has sensors to detect the ramp mechanism in its forwardmost and rearmost positions. The sensors send signals to the control circuitry which signals indicate the positions of the disks and the mechanisms. The control circuitry responds to the position information by sending pulses to the stepper-motors in the system to drive the mechanisms.

DESCRIPTION OF THE DRAWINGS

FIG. 5a is an enlarged view of the bottom of the supply hopper assembly showing the pusher device, and FIG. 5b is an enlarged view of the sensor device.

FIG. 6 is a left elevation view of the disk drive assembly showing the "disk-loaded" switch and the eject button.

FIG. 7 is a right elevation view of the ramp assembly showing the disk drive/conveyor belt assembly in its highest and lowest positions.

FIG. 11 is a block diagram showing the electrical connections between the functional units of the invention.

DESCRIPTION OF THE PREFERRED EMBODIMENT

External Description

Figure 1:
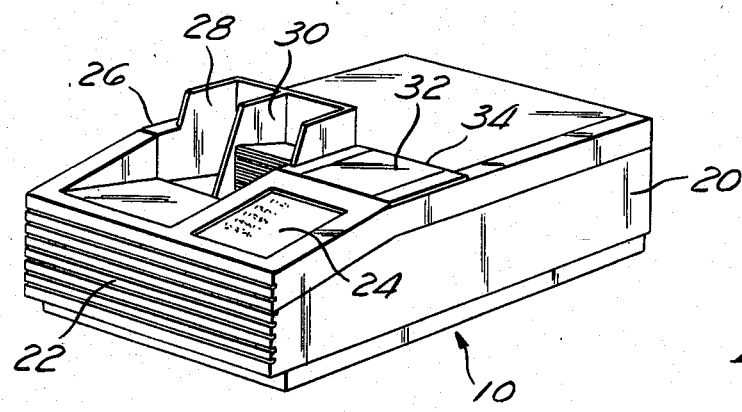
FIG. 1 is a front perspective view of the loader mechanism in its presently preferred embodiment.

FIG. 1 shows a preferred embodiment of the invention configured as a peripheral device for a master computer or other external control means. The device includes an enclosure 20 which can be of solid construction or, in the preferred embodiment, having a hinged front panel 22 which can be rotated forward to expose the internal mechanism. The upper surface of the front panel has a keyboard/display unit 24 which allows an operator to manually control the unit. Behind the front panel 22 is the hopper assembly 26 consisting of an accept bin 28, a supply hopper 30, and a reject bin 32, the latter being shown in this view with an optional lid 34 in its closed position over the reject bin 32. The device further includes a power cord, power switch, and interface connectors, all on the back side of the enclosure and not shown.

In the preferred embodiment, micro-floppy disks to be copied and/or verified are loaded into the supply hopper 30. By way of example, a specific embodiment constructed in accordance with this invention holds 50 disks. After the copying and/or verifying procedure is complete, the micro-floppy disks are transported to either the accept bin 28 or the reject bin 32, under control of an external control means or under manual control from the keyboard/display panel 24. In the exemplary embodiment, the accept bin 28 can hold up to 50 micro-floppy disks and the reject bin 32 can hold up to 25 micro-floppy disks.

Figure 2:
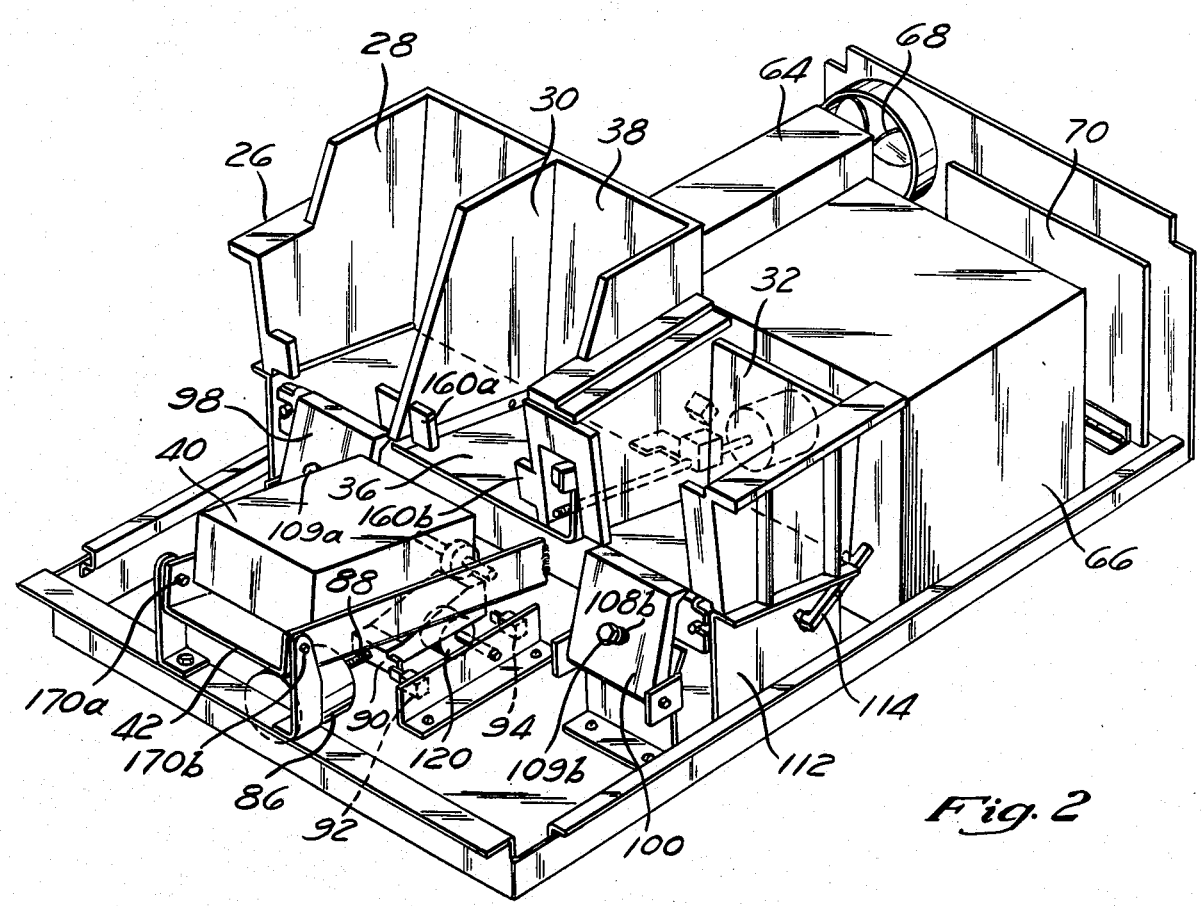
FIG. 2 is a perspective view of the complete assembly with the outside covers removed.

The Assembly for Loading Micro-Floppy Disks Into the Disk Drive From the Supply Hopper FIG. 2 shows the complete assembly of the device with the cover removed. As shown, the supply hopper 30 has a bottom surface 36 which is inclined at an angle from the horizontal in the preferred embodiment. The supply hopper 30, accept bin 28 and reject bin 32 advantageously share a common back wall 38 which is substantially perpendicular to the bottom surface 36 of the supply hopper 30. Thus, the back wall 38 is at an angle from a normal perpendicular to the bottom of the unit. The angle of inclination of the bottom surface 36 and back wall 38 is chosen such that the force of gravity causes the micro-floppy disks to rest against the back wall 38 in the supply hopper 30. By way of specific example, an angle of 10° has been used in the preferred embodiment.

The bottom surface 36 of the supply hopper 30 is aligned with the disk insertion opening (not shown) of the micro-floppy disk drive 40. Disk drive 40 is mounted in a pivotably mounted alignment framework 42. The hopper assembly 26 further includes a stepper-motor 45 which rotates a threaded shaft 44 which drives an internally threaded pusher assembly 46. FIG. 5a shows an expanded view of the bottom of the supply hopper 30 with the walls cut away to show the stepper-motor 45, threaded shaft 44, and pusher assembly 46 with more clarity. When the stepper-motor 45 is activated, the threaded shaft 44 rotates and the pusher assembly 46 is driven forward by the interaction of the threaded surfaces. The leading edge of the pusher assembly 46 is located in alignment with and in the plane of the bottommost micro-floppy disk 48 resting on surface 36. Accordingly, rotation of stepper-motor 45 to produce motion of the pusher assembly 46 results in engagement of the leading edge of pusher assembly 46 with the disk 48 such that the micro-floppy disk 48 is pushed forward into the disk insertion opening (not shown) of the disk drive 40.

The hopper assembly 26 further includes switches 50 and 52 (shown in FIG. 5a) which detect the presence of the pusher assembly in its forwardmost and rearmost positions, respectively.

The front of the supply hopper 30 is essentially open except for tabs 160a and 160b which are positioned such that only the bottommost micro-floppy disk 48 can move forward beneath the tabs when the pusher assembly 46 is driven forward. As shown in FIG. 5b, the hopper assembly 26 further includes a sensor assembly 54 located in the one side wall and the back wall 38 of the supply hopper 30 where the walls contact the bottom surface 36. The shape and size of the sensor assembly 54 is such that the inside surfaces of the sensor assembly 54 are aligned with the side wall and back wall 38 of the supply hopper 30. Thus, the micro-floppy disks 48 are guided to the bottom surface 36 of the supply hopper 30. The sensor assembly 54 includes an infrared transmitter 56 and an infrared sensor 58 positioned at an angle across the bottom corner of the supply hopper 30 and located above the surface 36 at a distance which is less than the thickness of a micro-floppy disk 48. The corner of a micro-floppy disk 48 at the bottom of the supply hopper 30 interrupts the infrared beam from the transmitter 56 to the sensor 58. When the last micro-floppy disk 48 is pushed from the supply hopper 30, the beam is no longer interrupted and the sensor 58 detects the infrared beam. As described below, the output of the sensor 58 is utilized by the control circuitry 66 to prevent the initiation of any further operations requiring the loading of a new disk.

Although stepper-motors are used to drive the pusher assembly 46 and other functions described below, it is understood that other means could be used. The use of stepper-motors, however, has been found to be advantageous since they provide a uniform force which can be precisely controlled. Furthermore, the torque of the stepper-motors are advantageously chosen such that neither the micro-floppy disk nor the assemblies will be damaged if a disk becomes jammed.

The Disk Drive

The disk drive 40 is a commercially available drive which is removably mounted in the pivotably mounted alignment framework 42 (shown in FIG. 2), such as, for example, Model OA-D31V, 3½" micro-floppy disk drive, available from Sony Corporation of Japan, or the like. The device described herein is concerned with loading disks into and unloading disks from the disk drive 40. The disk drive 40 is equipped with a separate interface cable through which it can receive commands from an external control means to write data to or read data from a disk which has been loaded into the disk drive 40. The bezel assembly which is typically supplied with the commercially available disk drive 40 has been removed to reduce the friction on the ejected disk 48 and to reduce the front to back dimension of the disk drive 40.

As shown in FIG. 6, microswitch 60, the "disk-loaded" switch, is attached to the side of the disk drive 40 to detect the presence of a micro-floppy disk 48 in the operational position. A micro-floppy disk 48 is inserted into the disk drive 40 from the front as a result of the previously described operation of the pusher assembly 46. As part of the normal operation of the disk drive 40, when the disk 48 is fully inserted into the disk drive 40, the internal mechanism of the disk drive causes the disk 48 to be lowered onto a spindle (not shown). This is illustrated by the two sets of phantom lines in FIG. 6. The "disk-loaded" switch 60 is closed by an external extension of the internal mechanism of the disk 40. Activation of switch 60 is used to indicate that the disk 48 is in place so that a signal can then be transmitted to a host computer or other control means to indicate that a disk drive operation can be initiated. FIG. 6 also shows an eject button 62 which is an integral part of the commercially available disk drive 40. When the eject button 62 is pushed, a spring-loaded mechanism (not shown) internal to the disk drive 40 causes the micro-floppy disk 48 to be ejected a substantial distance forward.

The Conveyor Belt Used to Transport Disks to the Accept and Reject Bins

Figure 3:
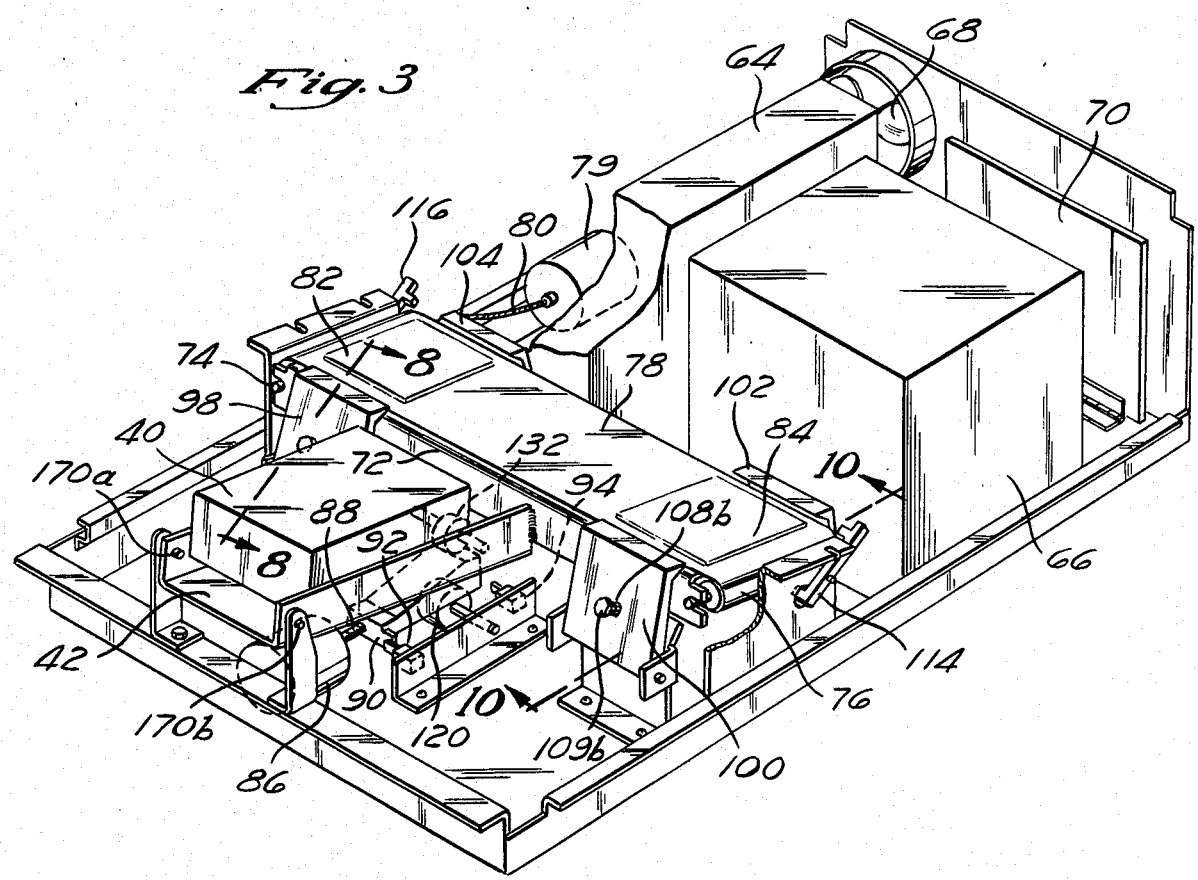
FIG. 3 is a perspective view of the complete assembly further showing the assembly with the supply hopper and accept and reject bins removed.
Figure 9:
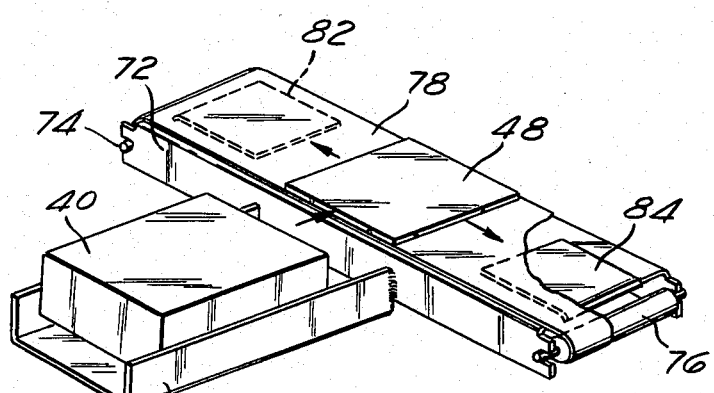
FIG. 9 is a perspective view of the alignment framework showing the movement of the disk onto the conveyor belt and the further movement of the disk to the left or right end of said conveyor belt.

As shown in FIG. 3, conveyor belt assembly 72 is mounted to the same alignment framework 42 on which the disk drive 40 is mounted. The conveyor belt assembly 72 consists of rollers 74 and 76 and continuous belt 78 over the rollers. Roller 76 is an idler roller. Roller 74 is driven by stepper-motor 79 via flexible shaft 80. Tension on the conveyor belt 78 is maintained in conventional manner by the elasticity of the belt. In addition, the conveyor belt 78 is maintained in a centered position on the rollers by a slight crown (not shown) in the rollers. As described below, a disk 48, after having been ejected from the disk drive 40, falls onto the conveyor belt 78 and is transported to either the accept bin 28 or the reject bin 32. As best shown in FIG. 9, the top surface of the conveyor assembly belt assembly 72, over which the conveyor belt 78 moves, includes two pads 82 and 84 having dimensions slightly smaller than the dimensions of the micro-floppy disks 48. The purpose for the pads 82 and 84 will be explained below in connection with FIG. 10.

The Ramp Assembly Used to Pivot the Alignment Framework and the Disk Drive

Figure 4:
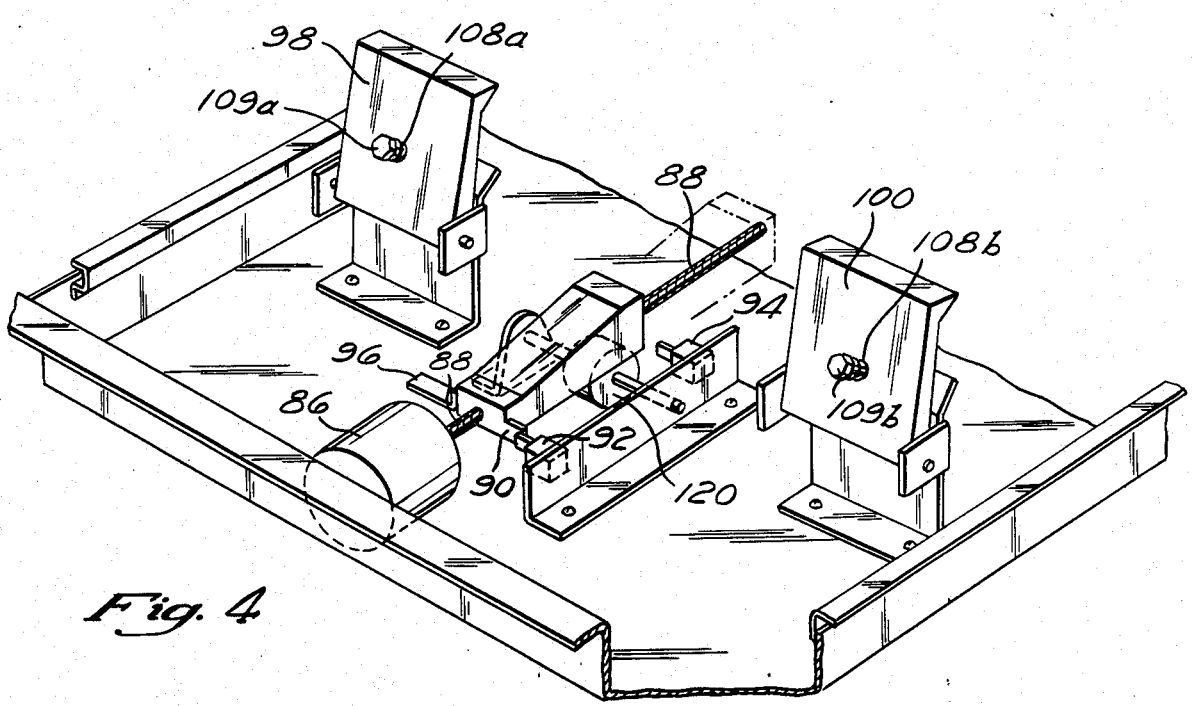
FIG. 4 is a perspective view of the complete assembly with the alignment framework removed.

As shown in FIG. 4, stepper-motor 86 rotates a threaded shaft 88 which is threaded through ramp assembly 90. Rotation of the threaded shaft 88 moves the ramp assembly 90 horizontally from its forwardmost to its rearmost positions, and vice versa. Switches 92 and 94 detect the ramp assembly 90 in its forwardmost and rearmost positions, respectively. Attached to the ramp assembly 90 is an eject lever 96 which will be explained below in connection with FIG. 8.

FIG. 7 illustrates the manner in which the alignment framework 42 is pivoted by the ramp assembly 90 via bearing assembly 118. The alignment framework 42 is mounted on pivot axes 170a and 170b and is supported by bearing assembly 118 which rides on ramp assembly 90. The ramp assembly 90 is supported by bearing assembly 120 which rotates on an axle 164 mounted to the bottom of the apparatus. When the ramp assembly 90 is in its forwardmost position (the left position shown in FIG. 7), the alignment framework 42 is in its highest position shown in phantom lines. In this position, the entrance (not shown) to the disk drive 40 is aligned with the bottom surface 36 of the supply hopper 30 such that a disk 48 can, as described above, be loaded into the disk drive 40. When the stepper-motor 86 is activated, the threaded shaft 88 rotates. The ramp assembly 90 has a threaded passageway for the threaded shaft 88. The rotation of the threaded shaft 88 in one direction causes the ramp assembly 90 to move to its rearmost position (to the right in FIG. 7). As the ramp assembly moves to its rearmost position, the bearing 132 rolls down the ramp and causes the alignment framework 42 to pivot to its lowest position (shown in solid lines in FIG. 7). In this position, the conveyor belt 78 is no longer in contact with the bottom of the hopper assembly 26. Therefore, when the micro-floppy disk 48 is ejected from the disk drive 40, it can pass beneath the hopper assembly 26 and land on the center portion of the conveyor belt 78. As explained before, switches 92 and 94 (shown in FIGS. 2, 3 and 4) detect the presence of the ramp assembly 90 in its forwardmost and rearmost positions, respectively.

As can be seen in FIG. 7, the weight of the alignment framework 42 is transmitted from bearing assembly 118 through ramp assembly 90 to bearing assembly 120. Thus, the entire weight of the alignment framework 42 is transmitted to the bearing assembly 120 and very little weight is imposed upon the threaded shaft 88. This allows for free movement of the ramp assembly 90 on the threaded shaft 88. The ramp assembly 90 has a flat horizontal surface at each end of the inclined surface. The bearing 132 rests on one of the two flat surfaces at either end of the ramp assembly 90. Since there is no tendency for the bearing 132 to move from either of these two stable positions, there is no force exerted by the threaded shaft 88 or the stepper-motor 86 to maintain the alignment framework 42 in its highest or lowest positions. Thus, the stepper-motor 86 does not require any electrical current, at either of these positions, and therefore does not induce any electrical noise in the system while the disk drive 40 is being operated.

Figure 8:
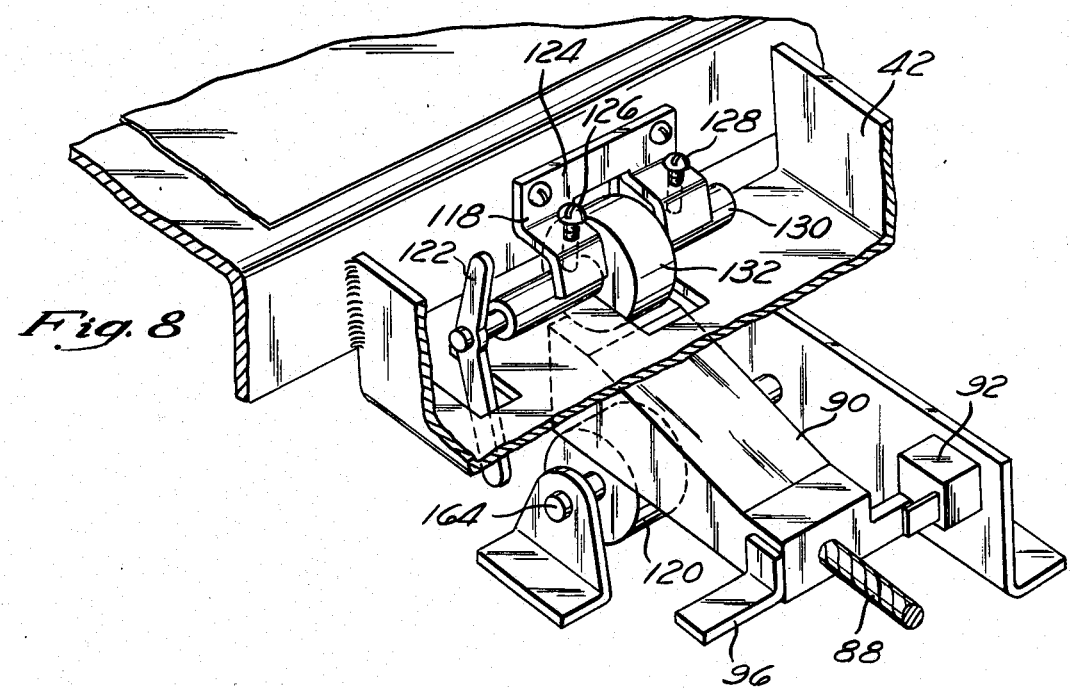
FIG. 8 is a left perspective view of the ramp assembly showing the mounting bearings, the eject cam and the limit swtches.

The ramp assembly 90 and the bearing assembly 118 are shown in more detail in FIG. 8. FIG. 8 also shows the bell crank 122 which is pivotably mounted to axle 130 and is caused to pivot by the forward motion of the eject lever 96 on ramp assembly 90. When the ramp assembly 90 is in its rearmost position, the eject lever 96 pushes against the bell crank assembly 122, and the uppermost portion of the bell crank 122 pushes against the eject button 62 on disk drive 40. As shown in FIG. 6 and described above, activation of the eject button 62 by the bell crank 122 causes the micro-floppy disks 48 to be ejected from the disk assembly 40 onto the conveyor belt 78.

The bearing assembly 118 is composed of bracket assembly 124, axle 130, screws 126 and 128, and bearing 132. The axle assembly 130 is mounted in the bracket assembly 124 and the bracket assembly 124 is mounted on the alignment framework 42 such that when the screws 126 and 128 are turned, the alignment framework 42 is raised or lowered in relation to the ramp assembly 90. Adjustment of the screws 126 and 128 allow the alignment framework 42 to be positioned such that the entrance (not shown) to the disk drive 40 is aligned with the bottom surface 36 of the supply hopper 30 when the alignment framework 42 is in its highest position.

The Ejected Disk Position Sensors

Figure 9A:
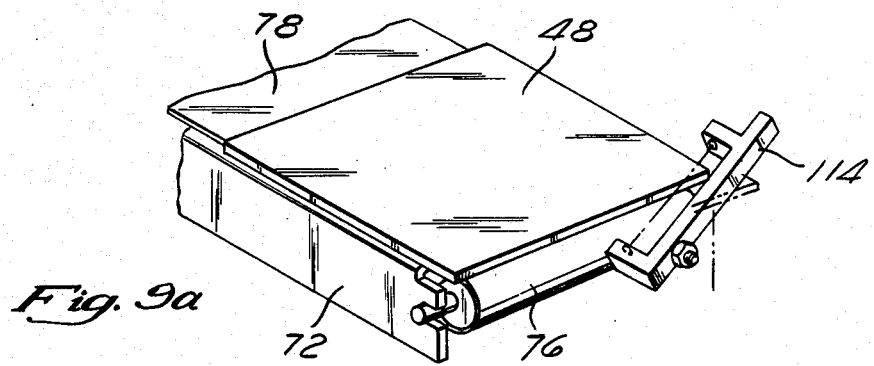
FIG. 9a is an enlarged section of one end of the conveyor belt assembly showing the operation of a sensor.

Referring to FIGS. 2, 3 and 9a, the hopper assembly 26 is mounted onto a frame 112. Attached to the frame 112 are infrared transmittor/sensor assemblies 114 and 116. As best shown in in FIG. 9a, the operation of the transmittor/sensor assembly 114 is such that the infrared light beam between the transmittor and receiver of transmittor/sensor 114 will be interrupted by the presence of a micro-floppy disk 48 at the right end of the conveyor belt 78. Similarly, the infrared light beam between the transmittor and the sensor of transmittor/sensor assembly 116 will be interrupted by the presence of a micro-floppy disk at the left end of the conveyor belt 78. The signals generated by the sensors when the beams are interrupted are used to indicate the presence of the micro-floppy disk 48 at either of the two locations and verify that the disk 48 can be pushed upward into either the accept bin 28 or the reject bin 32.

The Pawl Mechanisms for Loading the Disk Into the Accept and Reject Bins

Figure 10A:
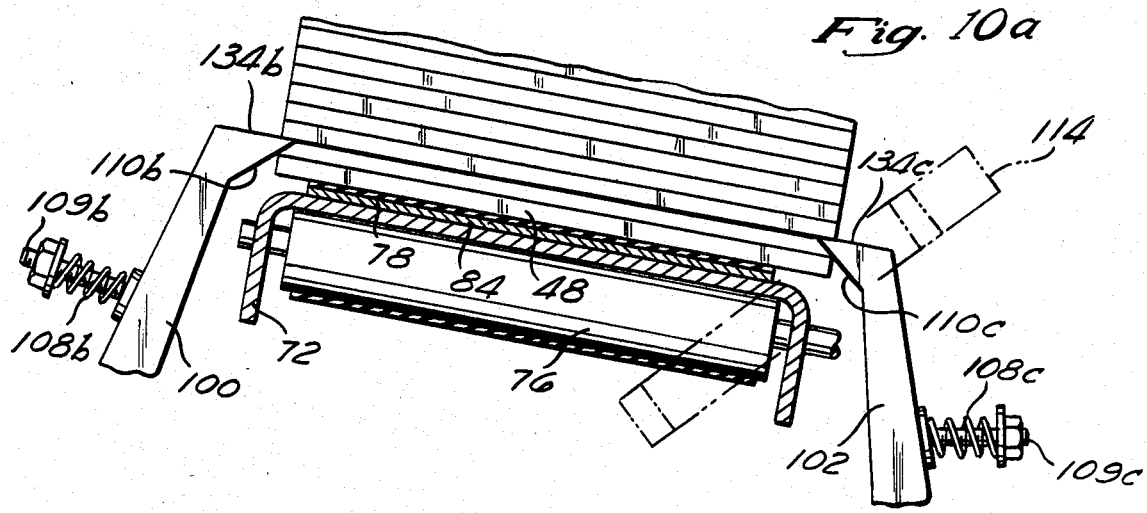
FIG. 10 is an end view of the conveyor belt assembly shown in its lowered position (FIG. 10a) and its raised position (FIG. 10b).

The pawl mechanism pairs 98 and 104, 100 and 102 are shown in FIGS. 2, 3, and 4 in their respective positions at either end and both sides of the conveyor belt assembly 72. The operation of the pawl mechanisms is illustrated in more detail in connection with FIGS. 10a and 10b which show a side elevation of the conveyor belt assembly 72 and depicts its relation to the pawl mechanisms 100 and 102. It will be understood that an analogous relationship exists between the conveyor belt 78 and the pawl mechanisms 98 and 104. As shown in FIG. 10a, the width of the pad 84 beneath the belt 78 is less than the length of a micro-floppy disk 48. As further shown, the inside surfaces 110b and 110c of the pawl mechanisms 100 and 102, respectively, are beveled such that the upward motion of the conveyor belt assembly 72 on the alignment framework 42 causes the micro-floppy disk 48 resting on the surface of the conveyor belt 78 to engage the surfaces 110b and 110c and push the pawl mechanisms 100 and 102 further apart. Until pushed apart, the top surfaces 134b and 134c of the pawl mechanisms 100 and 102 support any floppy disks which are in the reject bin 32. When the alignment framework 42 completes its upward motion, the micro-floppy disk 48 is pushed completely through the pawl mechanism pairs 100 and 102. The upper surfaces 134b and 134c of the pawl mechanisms 100 and 102 then return to their normal innermost positions and rest in an open space between the micro-floppy disks 48 and the conveyor belt 78. As shown in FIG. 2, the accept bin 28 and the reject bin 32 of the hopper assembly 26 are open-bottomed such that the micro-floppy disks can be pushed upwardly into these bins from below.

Figure 10B:
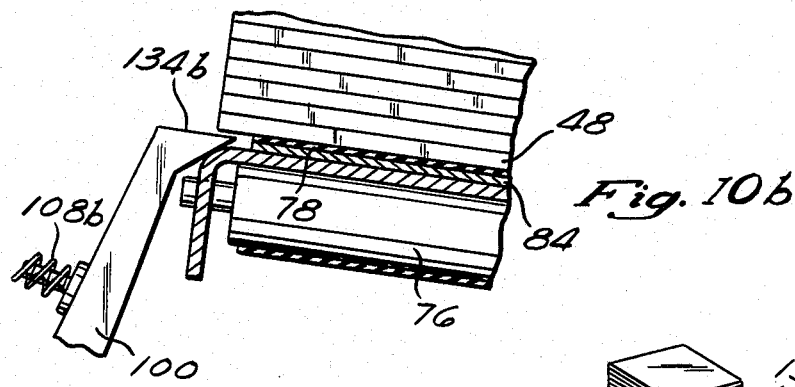

As seen in FIG. 10b, the width of the pad 84 is chosen such that the width is less than the distance between the pawl mechanisms 100 and 102. Thus, the pad 84 forces the belt 78 to protrude between the pawl mechanism pairs 100 and 102 and support the weight of the micro-floppy disks 48 in the bin. The weight of the stack of micro-floppy disks 48 is therefore transmitted through the conveyor belt 78 and pad 84 to the alignment framework 42. Thus, the weight of the micro-floppy disks 48 is upon the conveyor belt 78 and not upon the upper surfaces 134b and 134c of the latch mechanisms 100 and 102 in the resting position. Except for the short time when the alignment framework 42 is lowered to cause a micro-floppy disk 48 to be ejected from the disk drive 40, the weight of the stack of disks 48 is distributed across the surface area of the bottommost disk 48 rather just than on edges of disk 48 resting on the latch mechanisms 100 and 102. This advantageously reduces any stresses imposed on the edges of the bottommost micro-floppy disk 48.

Each pawl mechanism has tension biasing mechanisms consisting of a screw 109 and spring 108. Spring 108b exerts tension on latch mechanism 100 to return it to its normal position after the micro-floppy disk has passed through. Screw 109b adjusts the bias on the spring.

Functions of the Control Circuitry, Sensors and Stepper-Motors

As shown in the block diagram of FIG. 11, there are a number of sensors to provide feedback to control circuitry 66 with regard to the current position of the micro-floppy disks. Control circuitry responsive to sensors, as shown, for providing appropriate pulsed signals to stepper-motors is well known in the art and therefore is shown in block diagram form.

The sensor 58 in the bottom of the supply hopper 30 (FIG. 5b) signals the absence of any micro-floppy disks 48 in the supply hopper 30 when it detects the infrared beam from infrared transmitter 56. The absence of any disks 48 in the supply hopper 30, as indicated by the signal from sensor 58, causes the control circuitry 66 to reject any commands to load a disk 48 into the drive 40. In addition, the control circuitry 66 displays a "hopper empty" indication on the keyboard/display panel 24 and sends a "hopper empty" indication to the external control means. If the control circuitry 66 receives a load command when the supply hopper is not empty, pulsed signals are sent to stepper-motor 45, to cause forward movement of pusher assembly 46. Sensors 50 and 52 (FIG. 5a) detect the forwardmost and rearmost positions of the pusher assembly 46, respectively. When the pusher assembly 46 reaches the forwardmost position and activates sensor switch 50, the signal from sensor switch 50 indicates to the control circuitry 66 that the micro-floppy disk 48 has been loaded into the disk drive 40. The control circuitry 66 then reverses the stepper-motor 45 to return the pusher assembly 46 to its rearmost position. When the second sensor switch 52 detects that the pusher assembly 46 has returned to its rearmost position, the control circuitry 66 checks the sensor microswitch 60 on the disk drive 40 to determine whether the micro-floppy disk 48 is properly seated within the drive 40. If so, an operation completed signal is sent by the control circuitry 66 to the external control means and to the keyboard/display 24 to indicate that the copying and/or verifying routines can be performed on the micro-floppy disk 48. When a command is received from the keyboard/display 24 or the external control means to accept or reject the disk, the control circuitry 66 sends pulsed signals to ramp stepper-motor 86 to move the ramp assembly 90 to its rearmost position. The alignment framework 42 is lowered and the micro-floppy disk 48 is autormtically ejected onto the conveyor belt 78. When sensor switch 94 on the ramp assembly 90 signals the control circuitry 66 that the ramp assembly 90 is in its rearmost position, the sensor microswitch 60 on the disk drive 40 is checked by the control circuitry 66 to determine whether the micro-floppy disk 48 has been ejected from the disk drive 40. If the control circuitry 66 verifies that the micro-floppy disk 48 has been ejected, pulsed signals are sent to stepper-motor 79 to drive the conveyor belt 78 either to the left for an accept command or to the right for a reject command. When the sensors 114 and 116 at either end of the conveyor belt assembly 72 detect the presence of the micro-floppy disk 48, the stepper-motor 79 is stopped and the micro-floppy disk 48 is in the appropriate position beneath the selected accept bin 28 or reject bin 32. Pulsed signals are then sent to stepper-motor 86 to move the ramp assembly 90 to its forwardmost position. This action returns the disk drive 40 to the position where the entrance is aligned with the bottom surface 36 of the supply hopper 30, and also pushes the micro-floppy disk 48 into either the accept bin 28 or the reject bin 32. When the sensor switch 92 on the ramp assembly 90 signals the control circuitry 66 that the ramp assembly 90 has returned to its forwardmost position, the control circuity 66 stops the stepper-motor 86 and sends a signal to the keyboard/display 24 and to the external control means to indicate that the operation is complete and that another command can be accepted.

The use of stepper-motors and sensors provide a redundant means of controlling the movement of the assemblies within the invention. For each movement, the control circuitry 66 issues a specific number of pulsed signals to a stepper-motor. At the completion of the pulsed signals, the assembly should have travelled to a position which can be detected by one of the sensors. If the appropriate sensor does not send a signal to the control circuitry, the operation is not completed and damage to the disks or to the mechanism can be prevented. For example, if sensor switch 50 on hopper assembly 26 does not send a signal to the control circuitry 66 after stepper-motor 45 has been sent a specific number of pulsed signals, the control circuitry 66 can send an indication to the keyboard/display 24 and the external control means that a jam has occurred and that operator intervention is required. In some cases, a jam can be automatically cleared. For example, if sensor 114 does not indicate that the disk 48 has reached the end of the conveyor belt 78 after the specified number of pulsed signals to stepper-motor 79, the disk may have shifted to an angle with respect to the belt and failed to pass between the pawl mechanisms 100 and 102. In most instances, the conveyor belt 78 direction can be temporarily reversed to realign the disk 48 with the belt 78. The disk can then be transported to the end of the belt. Thus, the jam would automatically clear and operator intervention would not be required.

Overall Operation of the Invention

Figure 12:
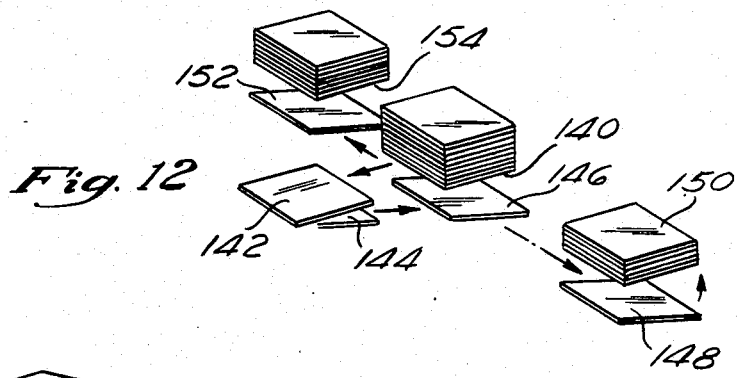
FIG. 12 is a schematic diagram showing the operation of the load and eject cycles of the unit.

FIG. 12 is a schematic illustration of the operation of the invention as it completes an entire cycle. The micro-floppy disks start the cycle as part of a stack of micro-floppy disks in the supply hopper represented as 140. The previously described, the pusher will push the lowermost micro-floppy disk into the drive when the drive is in the position represented as 142. The host computer or other external control means can generate commands to the drive to perform a copy, verify or other operation on the micro-floppy disk in the drive in position 142. The operation is controlled through cabling supplied with the micro-floppy disk drive and is not controlled by any circuitry within the invention described herein. The function of the micro-floppy disk drive while copying, verifying or otherwise operating upon the micro-floppy disk is not the subject of this invention. After the copying, verifying and/or other operation cycle has completed, an accept or reject command is sent to the invention via either the front panel keyboard or from the external control means. The disk drive is lowered into the position represented as 144. When it reaches the lowest position, the disk is caused to eject onto the conveyor in the position represented as 146. If a reject command has been received, pulsed signals are sent to the conveyor belt stepper-motor to cause the conveyor to transport the disk to the right beneath the reject bin in the position numbered 148. The conveyor belt assembly is then raised to push the disk into the bottom of the reject bin in the position labeled 150. If a command is sent to accept the disk, the conveyor belt transports the disk to the left to the position 152. The conveyor belt assembly is then raised to push the disk onto the bottom of the accept bin in the position labelled 154.

Additional Components in the Present Embodiment

Returning to FIG. 2, the device further includes a power supply 64, an input/output panel 70, and a fan 68. The power supply 64 is a commercially available unit which provides direct current power to the device. The fan 68 provides cooling air for the unit. The input/output panel 70 comprises interface connectors for signals to the control circuitry 66 and to the disk drive 40 from an external control means.

Alternative Embodiment Incorporating Master Disk Drive

Figure 13:
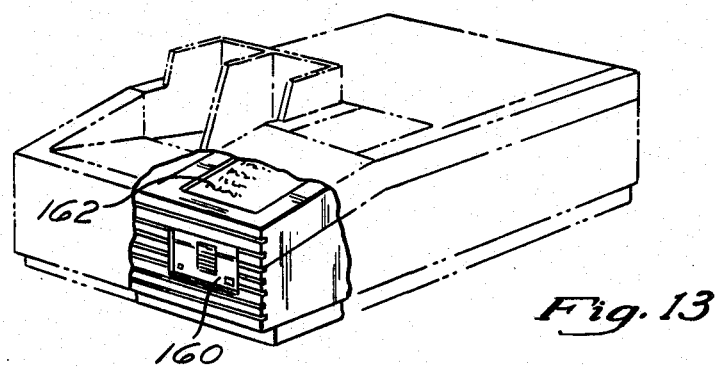
FIG. 13 is a perspective view of an alternative embodiment of the device, incorporating a master disk drive.

FIG. 13 shows an alternative embodiment of the instant invention with a built-in master drive. This alternative embodiment will include a host computer (not shown) which will copy data from the master drive 160 onto the disks loaded into the drive on the alignment framework. The internal host computer will send commands to the control circuitry 66 and control the disk drive 40 in the same manner as an external host computer in the preferred embodiment. The operation of a similar invention as a stand-alone copying/verifying unit is fully described in U.S. Pat. No. 4,494,156 issued on Jan. 15, 1985 for "DISK COPIER MACHINE HAVING A SELECTABLE FORMAT COMPUTER DISK CONTROLLER AND METHOD OF COPYING COMPUTER DISKS", corresponding to application Ser. No. 378,484, filed on May 14, 1982, and assigned to the assignee of the instant invention. The operator control panel assembly 162 shown in FIG. 13 will perform the operations previously described above in addition to further operations with regard to controlling the internal host computer. In this alternative environment, there is no need for an external host computer or other external control means.

The foregoing description of the preferred embodiment of the invention is an advantageous example of an implementation of the invention. While the principles of the invention have been described herein in connection with specific apparatus and applications, it is to be understood that this description is made by way of example only and not as a limitation of the scope of the invention.

What is claimed is:

1. A loader apparatus for moving a stack of micro-floppy computer disks into and out of a disk drive, said loader apparatus comprising:
   a hopper assembly including a supply hopper which can hold a stack of micro-floppy disks to be loaded into said disk drive, an accept bin and a reject bin to selectively receive micro-floppy disks that have been ejected from the disk drive;
   a pusher assembly for sequentially feeding the micro-floppy disk at the bottom of the supply hopper into the disk drive;
   a movably mounted alignment framework which includes a disk drive positioned to receive said micro-floppy disk pushed from the bottom of the stack when the framework is in a raised position;
   a conveyor belt assembly secured to said alignment framework and mounted in front of said disk drive and beneath said hopper assembly; and
   a translatable ramp assembly which lowers and raises the alignment framework, such that when the alignment framework is lowered, said disk drive is lowered and caused to eject a micro-floppy disk onto the conveyor belt, which conveyor belt translates the micro-floppy disk to one of two ends of the conveyor belt beneath a selected one of the reject bin and the accept bin, and such that when the alignment framework is raised, the micro-floppy disk is pushed into the selected bin by said conveyor belt assembly and the disk drive is returned to the position to receive a micro-floppy disk from the supply hopper.

2. A loader apparatus for moving a stack of micro-floppy computer disks into and out of a disk drive, said loader apparatus comprising:
   means including a supply hopper which can hold a stack of micro-floppy disks to be loaded into said disk drive, and including an accept bin and a reject bin to selectively receive micro-floppy disks that have been ejected from the disk drive;
   loading means for sequentially feeding a micro-floppy disk from the supply hopper into the disk drive;
   a movably mounted alignment framework which includes a disk drive positionable to a load position to receive said micro-floppy disk from said supply hopper;
   a conveyor belt assembly mounted to said alignment framework; and
   means for moving said alignment framework so that the disk drive is moved to an eject position and is caused to eject a micro-floppy disk onto the conveyor belt, which conveyor belt translates the micro-floppy disk to a selected position beneath one of the reject bin or the accept bin, said moving means further moving said alignment framework to position said disk drive to said load position after the micro-floppy disk is translated to said selected position to move the micro-floppy disk into said one of the reject bin or the accept bin.

3. A loader apparatus for moving a stack of micro-floppy computer disks into and out of a digital recording disk drive, said loader apparatus comprising:
   a hopper assembly including a supply hopper which can hold a stack of micro-floppy disks to be loaded into said disk drive, and including an accept bin and a reject bin to selectively receive micro-floppy disks that have been ejected from the disk drive;
   loading means for sequentially feeding a micro-floppy disk from the supply hopper into the disk drive;
   means for movably mounting said disk drive to a load position to receive the micro-floppy disk from said supply hopper and to an eject position to eject the micro-floppy disk from said disk drive;
   means for moving said micro-floppy disk after ejection from said disk drive to a position proximate to a selected one of the reject bin or the accept bin; and
   means for pushing said micro-floppy disk from said moving means into said selected one of the reject bin or the accept bin when said disk drive is moved to said load position.

4. The loader apparatus of claim 3, wherein the supply hopper comprises a rectangular container having an open top, a substantially open front side, solid side walls mounted substantially vertically, a back wall inclined at an angle from vertical, and a bottom surface which can be inclined at an angle perpendicular to the back wall.

5. The loader apparatus of claim 4, having two tabs positioned in the front side of the hopper at a distance from the bottom surface such that only one micro-floppy disk can pass between the bottom surface and said tabs.

6. The loader apparatus of claim 3, having means for sensing the presence of a micro-floppy disk in the supply hopper.

7. The loader apparatus of claim 6 wherein said sensing means comprises an infrared transmitter and an infrared receiver, said transmitter sending an infrared beam across a corner of the supply hopper, and wherein the receiver generates a signal responsive to the infrared beam.

8. The loader apparatus of claim 7, wherein the infrared beam is blocked if a micro-floppy disk is at the bottom of the supply hopper.

9. The loader apparatus of claim 3, wherein said loading means includes means for contacting the rear edge of the bottommost micro-floppy disk in the supply hopper, and moving the micro-floppy disk forward into the disk drive.

10. The loader apparatus of claim 9, wherein said loading means includes a pusher assembly mounted on a threaded shaft attached to a stepper-motor so that the rotation of the threaded shaft moves said pusher assembly.

11. The loader apparatus of claim 10, further including sensors which detect the forwardmost and rearmost limits of the pusher movement.

12. The loader apparatus of claim 3 wherein said means for movably mounting said disk drive comprises a pivotally mounted alignment framework.

13. The loader apparatus of claim 12 including means for moving said pivotally mounted alignment framework comprising a translatable ramp assembly which selectively raises and lowers said alignment framework.

14. The loader apparatus of claim 3 wherein said means for moving said micro-floppy disk after ejection from said disk drive comprises a conveyor belt assembly mounted in front of said disk drive and beneath said hopper assembly.

15. The loader apparatus of claim 14, wherein the micro-floppy disk ejected from the disk drive lands on the center portion of said conveyor belt.

16. The loader assembly of claim 15, wherein the said conveyor belt can selectively translate micro-floppy disks thereon to one of two ends of the conveyor belt.

17. The loader assembly of claims 15 or 16, which includes sensors at each end of the conveyor belt to sense the presence of a micro-floppy disk at an end of the conveyor belt.

18. The loader assembly of claim 14, wherein said conveyor belt assembly includes means at either end of the conveyor belt to push said micro-floppy disk into the bin above the disk.

19. The loader assembly of claim 14, wherein the conveyor belt is driven by a stepper-motor.

20. A loader apparatus for moving a stack of micro-floppy computer disks into and out of a digital recording disk drive, said loader apparatus comprising:
   a hopper assembly including a supply hopper which can hold a stack of micro-floppy disks to be loaded into said disk drive, and including an accept bin and a reject bin to selectively receive micro-floppy disks that have been ejected from the disk drive;
   loading means for sequentially feeding a micro-floppy disk from the supply hopper into the disk drive;
   means for movably mounting said disk drive to a load position to receive the micro-floppy disk from said supply hopper and to an eject position, comprising:
   a pivotally mounted alignment framework; and
   means for moving said pivotally mounted alignment framework comprising a translatable ramp assembly which selectively raises and lowers said alignment framework; said ramp assembly supported by a stationary bearing assembly and mounted on a threaded shaft so that rotation of the threaded shaft translates the ramp assembly with respect to the framework; and
   means for moving said micro-floppy disk after ejection from said disk drive to either the reject bin or the accept bin.

21. The loader assembly of claim 20, wherein said threaded shaft is rotated by a stepper-motor under control of the control circuitry.

22. A loader apparatus for moving a stack of micro-floppy computer disks into and out of a digital recording disk drive, said loader apparatus comprising;
   a hopper assembly including a supply hopper which can hold a stack of micro-floppy disks to be loaded into said disk drive, and including an accept bin and a reject bin to selectively receive micro-floppy disks that have been ejected from the disk drive;
   loading means for sequentially feeding a micro-floppy disk from the supply hopper into the disk drive;
   means for movably mounting said disk drive to a load position to receive the micro-floppy disk from said supply hopper and to an eject position, comprising:
   a pivotally mounted alignment framework; and
   means for moving said pivotally mounted alignment framework comprising a translatable ramp assembly which selectively raises and lowers said alignment framework, said ramp assembly having forwardmost and rearmost positions of travel;
   sensors for detecting said forwardmost and rearmost positions of travel of said ramp assembly; and
   means for moving said micro-floppy disk after ejection from said disk drive to either the reject bin or the accept bin.

23. The loader assembly of claim 22, wherein the sensors are microswitches.

24. A loader apparatus for moving a stack of micro-floppy computer disks into and out of a digital recording disk drive, said loader apparatus comprising:
   a hopper assembly including a supply hopper which can hold a stack of micro-floppy disks to be loaded into said disk drive, and an accept bin and a reject bin to selectively receive micro-floppy disks that have been ejected from the disk drive;
   loading means for sequentially feeding a micro-floppy disk from the supply hopper into the disk drive;
   means for movably mounting said disk drive to a load position to receive the micro-floppy disk from said supply hopper and to an eject position, comprising:
   a pivotally mounted alignment frmework; and
   means for moving said pivotally mounted alignment framework comprising a translatable ramp assembly which selectively raises and lowers said alignment framework, said ramp assembly having first and second ends of translation, wherein said alignment framework is in its highest (load) position when the ramp assembly is at one end of its translation, and wherein said alignment framework is in its lowers (eject) position when the ramp assembly is at the other end of its translation; and
   means for moving said micro-floppy disk after ejection from said disk drive to either the reject bin or the accept bin.

25. A loader apparatus for moving a stack of micro-floppy computer disks into and out of a digital recording disk drive, said loader apparatus comprising:
   a hopper assembly including a supply hopper which can hold a stack of micro-floppy disks to be loaded into said disk drive, and an accept bin and a reject bin to selectively receive micro-floppy disks that have been ejected from the disk drive;
   loading means for sequentially feeding a micro-floppy disk from the supply hopper into the disk drive;
   means for movably mounting said disk drive to a load position to receive the micro-floppy disk from said supply hopper and to an eject position, comprising:
   a pivotally mounted alignment framework; and
   means for moving said pivotally mounted alignment framework comprising a translatable ramp assembly which selectively raises and lowers said alignment framework; and an eject lever and a cam assembly, wherein the translation of the ramp assembly to the position where the alignment framework is in its lowest (eject) position causes the eject lever to push the cam assembly against an eject button of the disk drive and causes the micro-floppy disk to be ejected from the disk drive; and means for moving said micro-floppy disk after ejection from said disk drive to either the reject bin or the accept bin.

26. A loader apparatus for moving a stack of micro-floppy computer disks into and out of a digital recording disk drive, said loader apparatus comprising:

a hopper assembly including a supply hopper which can hold a stack of micro-floppy disks to be loaded into said disk drive, and an accept bin and a reject bin to selectively receive micro-floppy disks that have been ejected from the disk drive;

loading means for sequentially feeding a micro-floppy disk from the supply hopper into the disk drive;

means for movably mounting said disk drive to a load position to receive the micro-floppy disk from said supply hopper and to an eject position; and means for moving said micro-floppy disk after ejection from said disk drive to either the reject bin or the accept bin, comprising a conveyor belt assembly mounted in front of said disk drive and beneath said hopper assembly, said conveyor belt assembly lowered when said disk drive is in said eject position and raised when said disk drive is in said load position, said accept and reject bins having bottoms that are open to receive a micro-floppy disk when the conveyor belt assembly is raised.

27. The loader assembly of claim 26 wherein said accept and reject bins each include spring biased latch mechanisms which pivot to allow passage of micro-floppy disks upward through the latch mechanism, and which latch mechanisms return to their initial positions to prevent the downward movement of the micro-floppy disks.

28. The loader assembly of claim 27, wherein the number of latch mechanisms per bin is two.

29. The loader assembly of claim 28, wherein the micro-floppy disks in the accept and reject bins are supported by the conveyor belt assembly when the alignment framework is in its highest position.

30. A loader apparatus for moving a stack of micro-floppy computer disks into and out of a digital recording disk drive, said loader apparatus comprising:

a hopper assembly including a supply hopper which can hold a stack of micro-floppy disks to be loaded into said disk drive, and an accept bin and a reject bin to selectively receive micro-floppy disks that have been ejected from the disk drive;

loading means for sequentially feeding a micro-floppy disk drive from the supply hopper into the disk drive;

means for movably mounting said disk drive to a load position to receive the micro-floppy disk from said supply hopper and to an eject position, comprising a pivotally mounted alignment framework; and a conveyor belt assembly mounted to said pivotally mounted alignment framework.

31. The loader apparatus of claim 30, wherein the micro-floppy disk resting on said conveyor belt is pushed into the selected accept or reject bin when the said alignment framework is raised to its load position.

32. The loader apparatus of claim 31, wherein said conveyor belt supports the micro-floppy disks in the selected accept or reject bin when the alignment framework is in its raised (load) position.

33. A loader apparatus for moving a stack of semi-rigid micro-floppy computer disks into and out of a computer disk drive, said loader apparatus comprising:

a hopper assembly including a supply hopper which can hold a stack of micro-floppy disks to be loaded into said disk drive, and including an accept bin and a reject bin to selectively receive micro-floppy disks that have been ejected from the disk drive;

loading means for sequentially feeding a micro-floppy disk from the supply hopper into the disk drive;

means for positioning said disk drive in a load position to receive said semi-rigid micro-floppy disk from said loading means and for positioning said disk drive in an eject position to eject said semi-rigid micro-floppy disk from said disk drive;

a conveyor belt assembly for receiving said semi-rigid micro-floppy disk ejected from said disk drive and for conveying said semi-rigid micro-floppy disk to a position beneath the bottom of a selected one of the reject bin or the accept bin, and for pushing said semi-rigid micro-floppy disk upward into the selected one of the reject bin or the accept bin when said positioning means positions said disk drive in said load position.

34. A loader apparatus for moving a stack of micro-floppy computer disks into and out of a computer disk drive, said loader apparatus comprising:

a hopper assembly including a supply hopper which can hold a stack of micro-floppy disks to be loaded into the disk drive, an accept bin and a reject bin to selectively receive micro-floppy disks that have been ejected from the disk drive;

a pusher assembly for sequentially feeding the micro-floppy disk at the bottom of the supply hopper into the disk drive;

a movably mounted alignment framework which includes a disk drive secured in position to receive the micro-floppy disk which is pushed from the bottom of the stack, and which further includes a conveyor belt assembly mounted in front of said disk drive and beneath said hopper assembly;

a translatable ramp assembly which lowers and raises the alignment framework, such that when the alignment framework is lowered, the disk drive is lowered and caused to eject a micro-floppy disk onto the conveyor belt, which conveyor belt translates the micro-floppy disk to one of two ends of the conveyor belt beneath a selected one of the reject bin and the accept bin, and such that when the alignment framework is raised, the micro-floppy disk is pushed into the selected bin by said conveyor belt assembly and the disk drive is returned to the position to receive a micro-floppy disk from the supply hopper;

stepper-motors to move the pusher assembly, the ramp assembly and the conveyor belt; and sensors to detect the positions of micro-floppy disks and the pusher and ramp assemblies.

* * * * *